May 8, 1962 E. COULON 3,033,066
APPARATUS FOR SLOTTING THE ENDS OF TUBING
Filed March 4, 1960 2 Sheets-Sheet 1

Inventor
Edward Coulon

May 8, 1962   E. COULON   3,033,066
APPARATUS FOR SLOTTING THE ENDS OF TUBING
Filed March 4, 1960   2 Sheets-Sheet 2
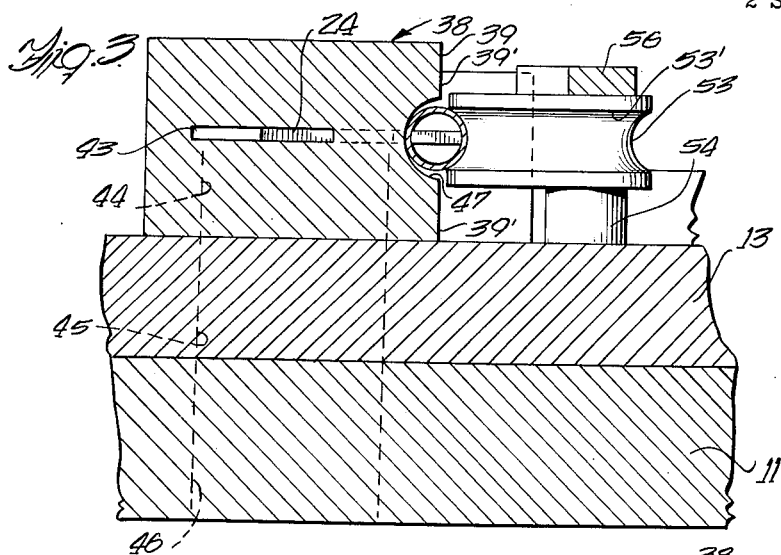
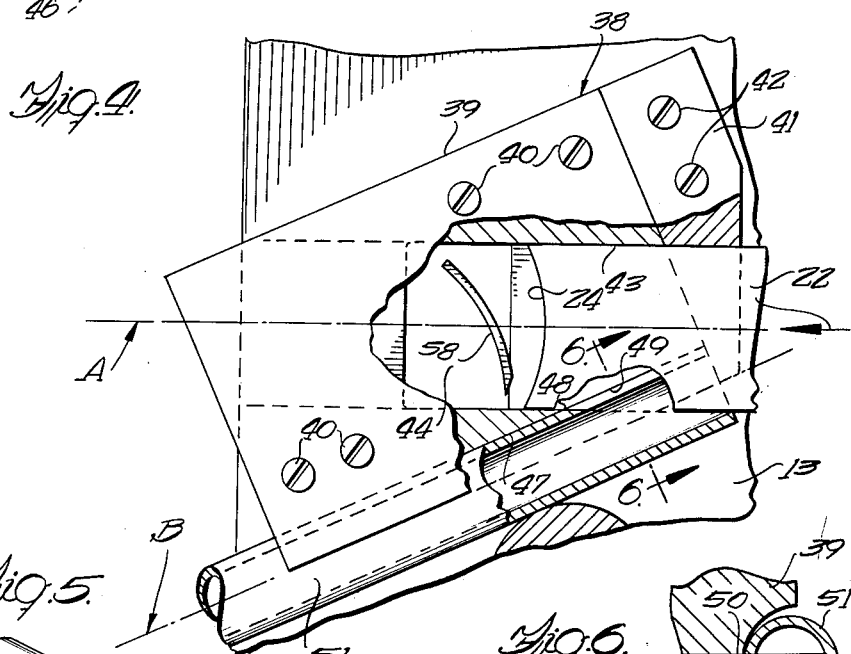
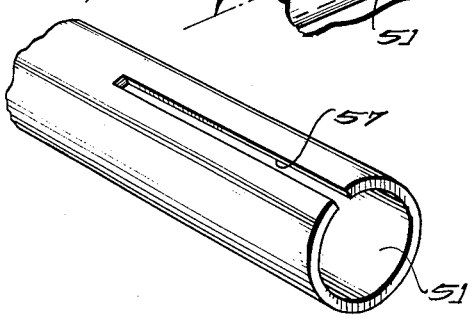
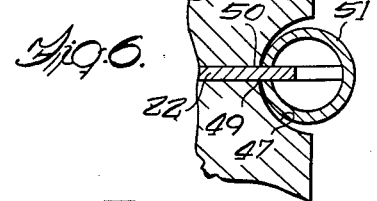
Inventor
Edward Coulon
Hilward O. Vogel
Attorney United States Patent Office 3,033,066
Patented May 8, 1962

3,033,066
APPARATUS FOR SLOTTING THE ENDS
OF TUBING
Edward Coulon, Chicago, Ill., assignor to Vogel Tool &
Die Corporation, a corporation of Illinois
Filed Mar. 4, 1960, Ser. No. 12,841
4 Claims. (Cl. 83—191)

This invention relates to an apparatus for providing slots in the ends of tubings. More specifically the invention relates to an improved apparatus for providing an exceptionally long slot in the end portion of a tubular member.

In the construction of tubular members it is frequently necessary to provide elongated slots in the ends of the tube. Such slots may be provided by the utilization of a milling machine but such methods are exceedingly costly in view of the slow operation of the machine and thus this method is impractical from a production standpoint. If the slot is substantially short in length it is possible to utilize a punch member from the inside of the tube and by pushing the punch member through the tube and through a die which contains the tube a suitable slot may be formed. This method however is also limited in that only short length slots are capable of being formed since the length of the punch member is necessarily limited by reason of the fact that the punch will break off, if it is too long and will not stand the stresses of heavy manufacture. Another method of slotting the ends of a tube comprises the insertion of a mandrel or female die member within the tube, the said die member having a slot conforming to the slot to be formed in the tube. Then by forcing a punch member from the exterior point of the tube through the tube and through the mandrel a slot can be formed. This procedure also has limitations since in many instances the tube wall thickness in relation to its diameter is too great to accommodate a mandrel which in turn must be provided with a slot, the mandrel in such an instance being too weak to withstand the stresses which are encountered.

It is therefore a prime object of this invention to provide an improved apparatus for providing long slots in the end of a tube.

It is another object of the invention to provide an improved apparatus which is simple in construction and which will suitably clamp a tube in position so that its end may be expeditiously slotted.

A more specific object is the provision of a suitable shearing unit adapted for cutting slots in the end of a tube the said shearing unit comprising a die or tube holder which is suitably recessed to support and clamp a tube. The said tube being positioned at an angle relative to a shearing blade which engages cutting portions on the die whereupon movement of the cutting blade through the open end of the tube at an angle relative to the longitudinal center line of the tube a slot is formed in the end of the tube.

These and more specific objects will become more readily apparent from a reading of the specification when examined in connection with the accompanying sheets of drawings.

In the drawings:

FIGURE 3 is an enlarged cross sectional view through a tube support and die member taken substantially along the line 3—3 of FIGURE 2;

FIGURE 4 is an enlarged view taken substantially along the line 4—4 of FIGURE 1 showing certain portions of a clamping and die member broken away to clearly illustrate the elements and functions;

FIGURE 5 is a perspective view of a tube end slotted by the improved apparatus; and FIGURE 6 is a detailed cross sectional view of a pair of cutting edges of a die member taken along the lines 6—6 of FIGURE 4.

Figure 1:
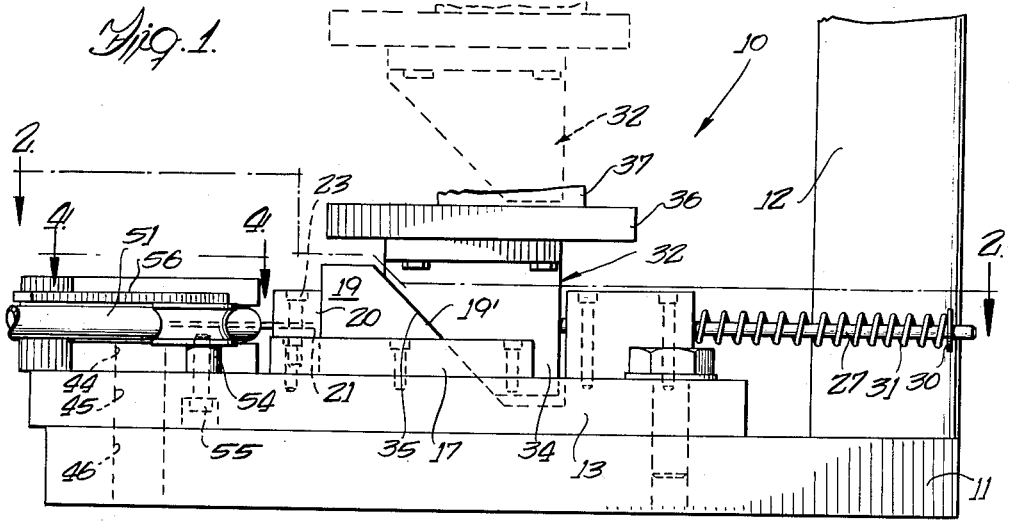
FIGURE 1 is a side elevational view of an apparatus for slotting the ends of tubing.
Figure 2:
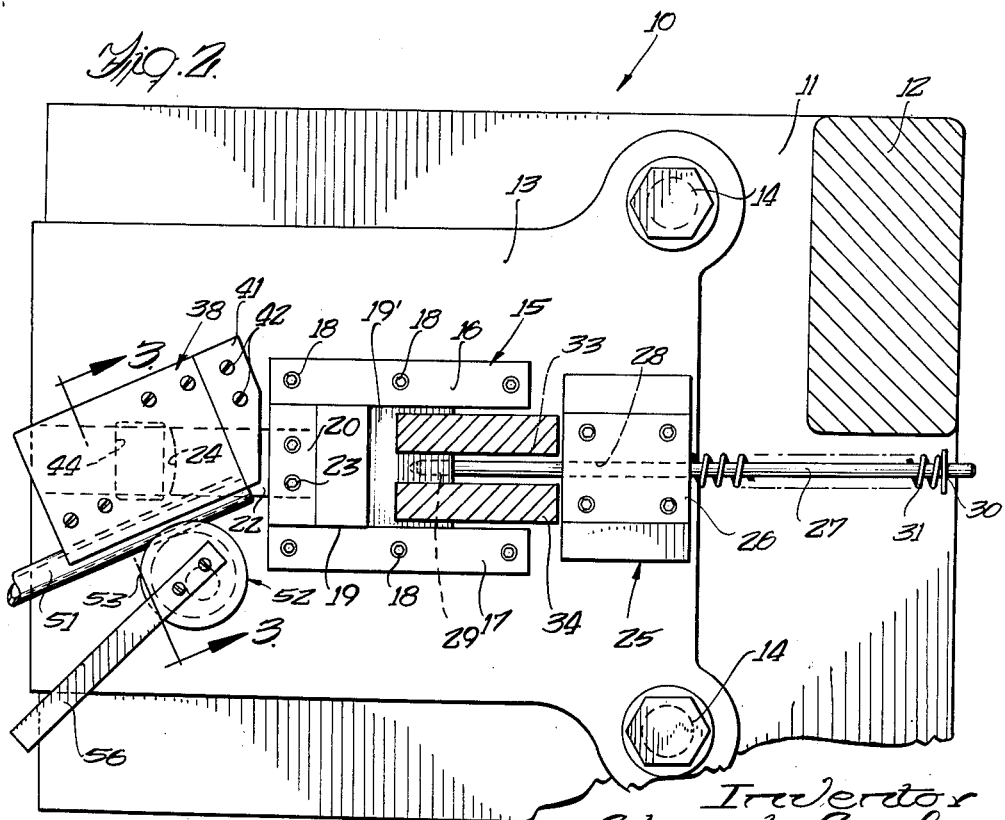
FIGURE 2 is a cross sectional view of a slotting apparatus taken substantially along the line of 2—2 of FIGURE 1.

Referring now to FIGURES 1 and 2 an apparatus for slotting the ends of tubing is generally designated by the reference character 10. The apparatus 10 comprises a bolster plate 11 which may form the bed of a suitable punch press which contains a vertical post 12. The particular apparatus 10 disclosed is shown therefore on the bed or bolster plate 11 of a punch press though other actuating type of devices may be utilized and the invention is not limited with respect thereto. The apparatus 10 further comprises a base 13 which by means of bolts 14 is suitably connected to the bolster plate 11. A guide support 15 includes laterally spaced guide members 16 and 17 which by means of screws 18 are secured to the base 13. A blade holder is designated at 19, the said blade holder 19 having a cam face 19'. The forward face of the blade holder 19 includes a blade connecting member or projection 20 provided with a suitable slot 21 which supports a flat longitudinally projecting blade 22. The blade 22 is secured in the blade connecting member 20 and within the slot 21 by means of suitable screws 23. The blade is relatively thin in thickness and is approximately the thickness of the slot to be formed in the end of the tube. The blade has a substantial width dimension compared with its thickness as indicated. The blade also includes at its forward end an arcuate cutting edge 24. The arcuate cutting edge 24 is best shown in FIGURE 4.

Referring now particularly to FIGURES 1 and 2 a blade return mechanism is designated at 25. The return mechanism 25 comprises a block 26 suitably connected to the base 13. A rod 27 extends through a bore 28 in the block 26 and is threaded into the blade holder 19 as indicated at 29. The extreme end of the rod 27 is provided with a stop 30 which contains a spring 31 the said spring 31 normally urging the blade holder 19 to a return position.

A cam is designated at 32 the said cam 32 being movable in a vertical direction. The cam 32 includes cam members 33 and 34 having cam surfaces 35 engaging the cam surface 19' as shown in FIGURE 1 wherein the blade holder 19 is shown in its advanced or extreme cutting position. The cam 32 is connected to a plate 36 which has projecting vertically therefrom a shank 37 suitably connected to the ram (not shown) of a punch press.

Referring now particularly to FIGURES 2 and 4 a die member is designated by the reference character 38. The die member 38 comprises a die block 39 which is suitably connected by means of screws 40 to the base 13. A blade guide block 41 is also suitably connected to the base 13 by means of screws 42. As best shown in FIGURES 3 and 4 the die 38 is provided with a slot 43. The slot 43 is provided with a longitudinal center line designated at A in FIGURE 4, the said center line also extending through the center of the blade and through the center line of the die and the center line of the blade holder 19. As best shown in FIGURE 4 the die block 39 is also provided with a vertically extending slug clearance hole 44 and as shown in FIGURE 1 this clearance hole 44 is in vertical registry with suitable clearance holes 45 and 46 respectively provided in the base 13 and the bolster plate 11.

A vertical base 39' of the die block 39 is provided with a longitudinally extending recess 47. The recess 47 intersects the slot 43, as best shown in FIGURE 4, at a point designated at 48 and with the slot 43 provides, as best shown in FIGURE 6, lower and upper cutting edges 49 and 50.

A conventional tube is indicated at 51 which is suitably clamped within the recess 47 by means of a clamping member designated at 52. The clamping member comprises an eccentric cam 53 which is provided with an annular recess 53' conforming to the shape of the tube 51. The cam 53 is supported on an eccentric member 54 suitably rotatably mounted by means of a screw 55 to the base 13, the said eccentric cam 53 being rotatable by means of a handle 56. As shown in FIGURE 5 the finished slot in the tube 51 is designated at 57.

*Operation*

The apparatus 10 in all of these figures is shown with the blade at the end of its cutting position. In FIGURE 1 the cam 32 shown in dotted lines is in its upward position. The blade holder 19 has been returned to its extreme rearmost position by means of the spring 31. As the cam 32 moves downwardly the cam surfaces 35 engage the cam face 19' and therefore moves the blade holder 19 forwardly.

A tube has been securely clamped in position by means of the clamping member 52. Therefore a portion of the tube now covers the cutting edges 49 and 50 and the open end of the tube is positioned adjacent the cutting edge 24 in its retracted position. As the blade 22 is moved forwardly in its slot 43 the cutting edge 24 initially engages that portion of the tube at the end of said tube whereupon it initially moves through the end of the wall of the tube and through the cutting edge and progressively shears the end portion of the tube along the cutting edges 49 and 50 until the point of intersection of the recess 47 with the slot 43 as indicated at 48 whereupon the slug 58 is broken free and drops through the opening 44. Thus the action of the blade and cutting edge 24 with the shearing edges 49 and 50 is a progressive shearing rather than a punching operation. The arcuate shape of the cutting edge 24 provides for the curling of the slug 58 which serves to help in the breaking free of the slug from the tube end. The blade is then retracted by means of the spring 31 and the operation is repeated.

A longitudinal center line through the tube 51 as designated at B and this center line intersects the center line A as indicated. The angle formed by the two center lines A and B must be less than 90° in order to secure the shearing action desired. Thus the center lines A and B and recess 47 converge in the direction of the blade 22.

The length of slot which may be cut by this apparatus is only limited by the internal diameter of the tube and obviously in large diameter tubes, great lengths may be sheared.

Thus the objects of the invention have been fully achieved. Changes and modifications may be made without departing from the spirit of the invention or the scope thereof as defined in the appended claims.

What is claimed is:

1. An apparatus for cutting slots in the ends of tubing comprising a base, a guide support mounted on said base, a blade holder slidably positioned relative to said support and guided thereby for longitudinal movement along a longitudinal centerline, said blade support having a cam surface, a cutting member projecting longitudinally on said center line from said blade holder, said cutting member including a relatively flat blade having opposite sides and upper and lower flat surfaces and a lateral width substantially greater in dimension than its thickness, the thickness of said blade being approximately the width of a slot to be formed, a transverse first cutting edge on said blade, a die supported on said base, said die having a flat slot extending along said centerline, said slot conforming to the shape of said blade and receiving the same in relative telescoping sliding relation, said die confining said blade in said slot to support the same on at least one of said sides and on its upper and lower flat surfaces, a tube support on said die, said support comprising an arcuate recess formed in said die, said recess extending angularly relative to said centerline and in converging relation relative to said blade, said recess intersecting said slot to provide on said die member a pair of opposed second cutting edges, said recess being adapted to support a tube having an open end with said tube end having a wall portion which is to be slotted disposed against said cutting edges and supported on portions of said die adjacent said cutting edges and in the line of movement of said blade, means clamping a tube in said recess, a cam member movable against said cam face, and means moving said cam member against said cam face whereby said blade is moved through said open end of said tube and said first cutting edge cuts through said wall portion and between said second cutting edges whereby a slot is sheared in the end of said tube.

2. An apparatus for cutting slots in the ends of tubing comprising a base, a guide support mounted on said base, a blade holder slidably positioned relative to said support and guided thereby for longitudinal movement along a longitudinal centerline, a cutting member projecting longitudinally on said center line from said blade holder, said cutting member including a relatively flat blade having opposite sides and upper and lower opposed flat surfaces and a lateral width substantially greater in dimension than its thickness, the thickness of said blade being approximately the width of a slot to be formed, a transverse first cutting edge on said blade, a die supported on said base, said die having portions defining a flat slot extending along said centerline, said slot conforming to the shape of said blade and receiving the same in telescoping relative sliding relation, said die confining said blade in said slot to support the same on at least one of said sides and on its upper and lower flat surfaces, a tube support on said die, said support comprising an arcuate recess formed in said die, said recess extending angularly relative to said centerline and in converging relation relative to said blade, said recess intersecting said slot to provide on said die member a pair of opposed second cutting edges, said recess being adapted to support a tube having an open end with said tube end having a wall portion which is to be slotted disposed against said cutting edges and supported on said die adjacent said cutting edges and in the line of movement of said blade, means clamping a tube in said recess, and means moving said blade holder whereby said blade is moved through said open end of said tube and said first cutting edge cuts through said wall portion and between said second cutting edges whereby a slot is sheared in the end of said tube.

3. An apparatus for cutting slots in the end of tubing in accordance with claim 2, said first cutting edge having an arcuate configuration.

4. An apparatus for cutting slots in the end of tubing in accordance with claim 2, whereby a longitudinal centerline of the clamped tube intersects the longitudinal centerline of said cutting member at an angle less than 90 degrees.

References Cited in the file of this patent

UNITED STATES PATENTS

| | | |
|---|---|---|
| 1,230,319 | Paulson | June 19, 1917 |
| 2,250,931 | Grieder | July 29, 1941 |
| 2,633,890 | Rozaner | Apr. 7, 1953 |